United States Patent
Abdi Taghi Abad et al.

(10) Patent No.: US 11,763,203 B2
(45) Date of Patent: Sep. 19, 2023

(54) METHODS AND ARRANGEMENTS TO ADJUST COMMUNICATIONS

(71) Applicant: Capital One Services, LLC, McLean, VA (US)

(72) Inventors: Fardin Abdi Taghi Abad, Champaign, IL (US); Austin Grant Walters, McLean, VA (US); Jeremy Edward Goodsitt, McLean, VA (US); Reza Farivar, McLean, VA (US); Vincent Pham, McLean, VA (US); Anh Truong, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/843,066

(22) Filed: Jun. 17, 2022

(65) Prior Publication Data

US 2022/0398499 A1   Dec. 15, 2022

Related U.S. Application Data

(63) Continuation of application No. 16/287,530, filed on Feb. 27, 2019, now Pat. No. 11,392,853, which is a
(Continued)

(51) Int. Cl.
| | |
|---|---|
| *G06N 20/00* | (2019.01) |
| *G06F 16/31* | (2019.01) |
| *G06Q 30/016* | (2023.01) |
| *G06F 40/30* | (2020.01) |
| *G06F 40/47* | (2020.01) |
| *G06F 40/56* | (2020.01) |
| *G06F 40/247* | (2020.01) |
| *G06F 40/268* | (2020.01) |

(52) U.S. Cl.
CPC .......... *G06N 20/00* (2019.01); *G06F 16/316* (2019.01); *G06F 40/247* (2020.01);
(Continued)

(58) Field of Classification Search
CPC ..... G06N 20/00; G06F 16/316; G06F 40/247; G06F 40/268; G06F 40/30; G06F 40/47; G06F 40/56; G06Q 30/016
See application file for complete search history.

(56) References Cited

U.S. PATENT DOCUMENTS 5,497,319 A * 3/1996 Chong .................. G06F 40/151
707/999.001
6,301,554 B1 * 10/2001 Christy ................ G06F 40/211
704/7
(Continued)

*Primary Examiner* — Eric Yen
(74) *Attorney, Agent, or Firm* — KDW Firm PLLC

(57) ABSTRACT

Logic may adjust communications between customers. Logic may cluster customers into a first group associated with a first subset of synonyms and a second group associated with a second subset of the synonyms. Logic may associate a first tag with the first group and with each of the synonyms of the first subset. Logic may associate a second tag with the second group and with each of the synonyms of the second subset. Logic may associate one or more models with pairs of the groups. A first pair may comprise the first group and the second group. The first model associated with the first pair may adjust words in communications between the first group and the second group, based on the synonyms associated with the first pair, by replacement of words in a communication between customers of the first subset and customers of the second sub set.

20 Claims, 8 Drawing Sheets

Related U.S. Application Data continuation of application No. 16/286,999, filed on Feb. 27, 2019, now Pat. No. 10,482,185.

(52) U.S. Cl.
CPC ............ *G06F 40/268* (2020.01); *G06F 40/30* (2020.01); *G06F 40/47* (2020.01); *G06F 40/56* (2020.01); *G06Q 30/016* (2013.01)

(56) References Cited

U.S. PATENT DOCUMENTS

| | | | | |
|---|---|---|---|---|
| 8,838,437 | B1* | 9/2014 | Buryak | G06F 40/263 704/8 |
| 10,083,168 | B1* | 9/2018 | Armitage | G06F 40/253 |
| 2001/0053969 | A1* | 12/2001 | Hogenhout | G10L 13/00 715/267 |
| 2003/0040899 | A1* | 2/2003 | Ogilvie | G09B 19/04 704/2 |
| 2005/0267738 | A1* | 12/2005 | Wilkinson | G06Q 10/107 704/9 |
| 2008/0059421 | A1* | 3/2008 | Baartman | G06Q 10/107 |
| 2009/0006565 | A1* | 1/2009 | Velusamy | G06Q 10/107 715/733 |
| 2015/0161104 | A1* | 6/2015 | Buryak | G06F 40/263 704/8 |
| 2015/0279360 | A1* | 10/2015 | Mengibar | G10L 15/1815 704/257 |
| 2016/0350289 | A1* | 12/2016 | Zhao | G06F 40/45 |
| 2018/0032500 | A1* | 2/2018 | DeLuca | H04L 51/063 |
| 2018/0039608 | A1* | 2/2018 | Sharifi | G06F 40/189 |
| 2018/0285339 | A1* | 10/2018 | Bostick | G06N 5/04 |
| 2019/0155877 | A1* | 5/2019 | Sharma | G06F 40/151 |

\* cited by examiner

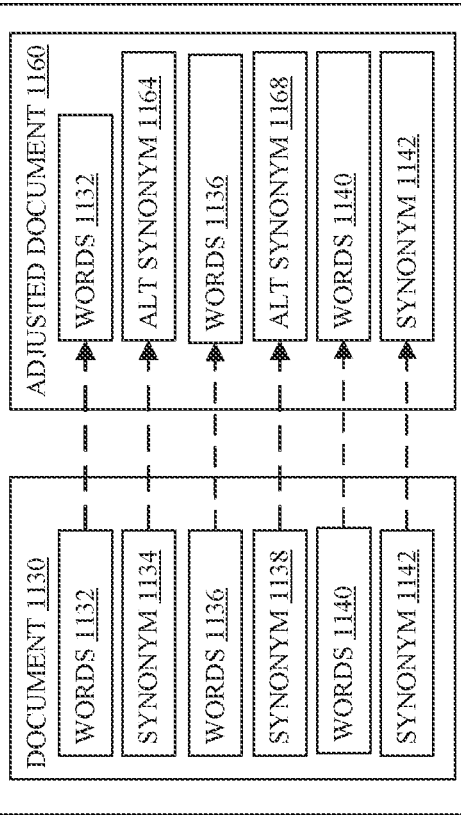
FIG. 1B
FIG. 1C
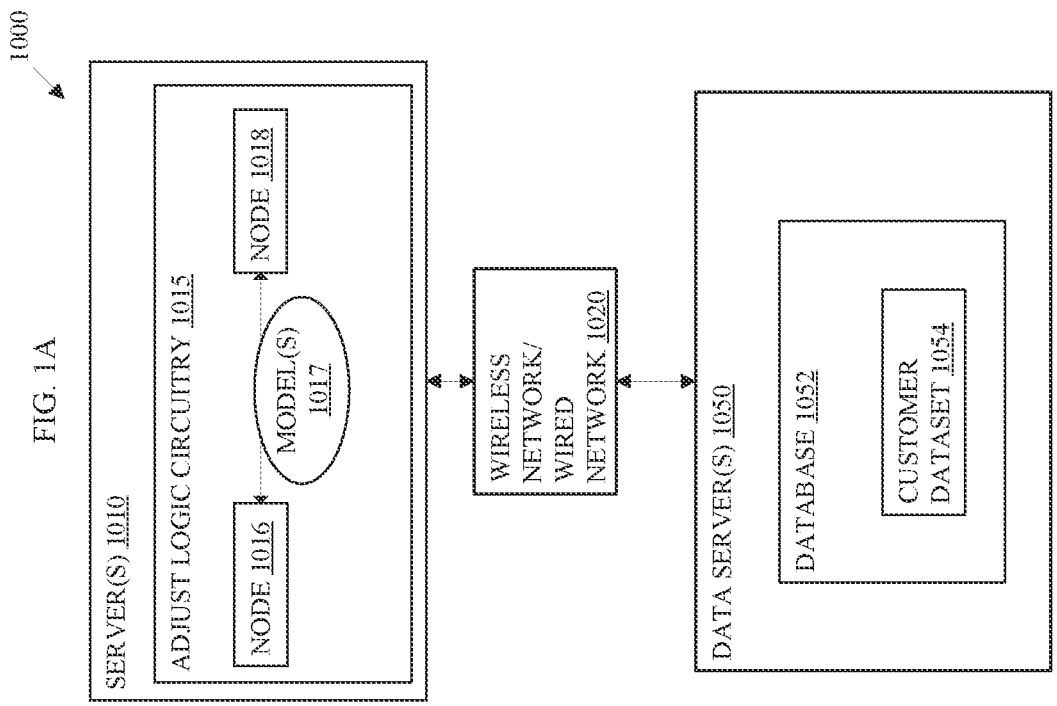
FIG. 1A

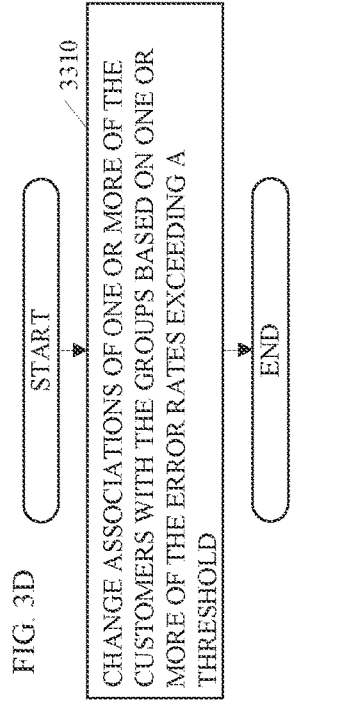
FIG. 3B
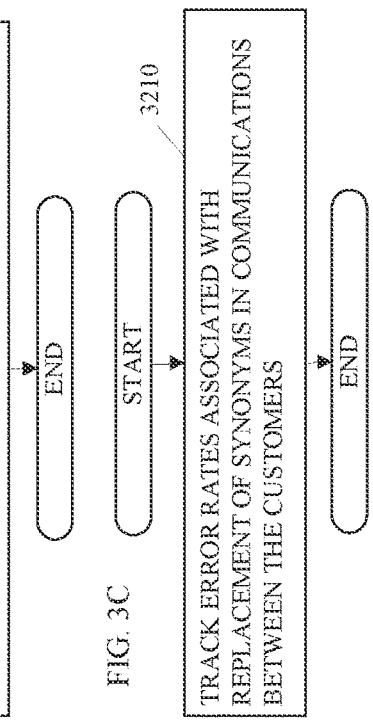
FIG. 3D
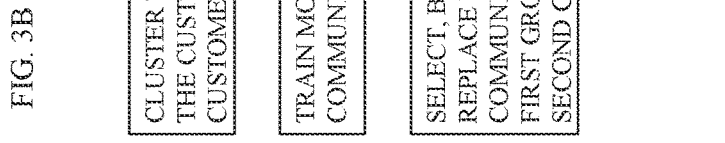
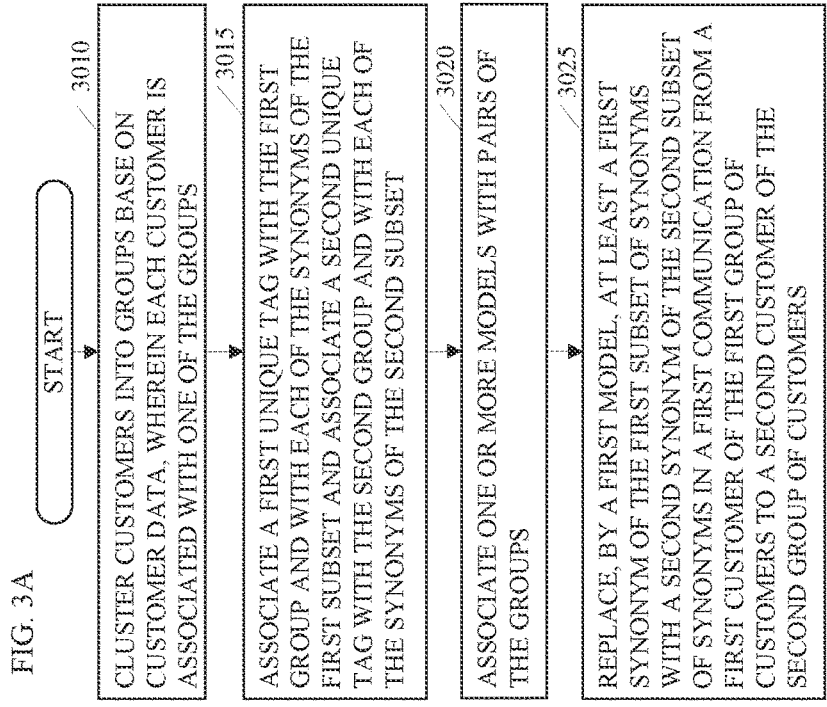
FIG. 3A
FIG. 3C

METHODS AND ARRANGEMENTS TO ADJUST COMMUNICATIONS

RELATED APPLICATIONS

This application is a Continuation of U.S. patent application Ser. No. 16/287,530 entitled "METHODS AND ARRANGEMENTS TO ADJUST COMMUNICATIONS", filed Feb. 27, 2019, which is a Continuation of U.S. patent application Ser. No. 16/286,999, entitled "METHODS AND ARRANGEMENTS TO ADJUST COMMUNICATIONS" filed on Feb. 27, 2019. The contents of the aforementioned application is incorporated herein by reference.

TECHNICAL FIELD

Embodiments described herein are in the field of text modification. More particularly, the embodiments relate to methods and arrangements to adjust words in communications.

BACKGROUND

Communications between persons with disparate backgrounds is commonplace whether it be for technical support, customer service, general communications between persons in different geographical locations, or the like. Such communications can be challenging when persons have significantly different educational backgrounds or experiences, or different dialects.

Currently, we rely on the individuals authoring communications to present ideas in a communication in a form for the intended audience. In some instances, these audiences are generally known to the persons communicating. In some instances, these audiences are not known well or just not known even though information about the recipient(s) may be generally available.

An author may find that a first attempt at conveyance of an idea uses language that is not well understood by the recipient(s). As a result, the author may receive feedback from the recipient(s) of the communication indicating that a portion of the communication is not well understood or is misunderstood. In response, the author can revise or otherwise describe the pertinent portions of the communication in different terms that may improve the understanding by the recipient(s). Such an iterative process can, in some instances, cause a negative impression related to the overall communication, which is neither helpful nor conducive to ongoing communications between the author and the recipient(s).

SUMMARY

Embodiments may include various types of subject matter such as methods, apparatuses, systems, storage media, and/or the like. One embodiment may include a system comprising: memory; and logic circuitry coupled with the memory. In some embodiments, the logic circuitry may cluster customers into groups based on customer. The at least two groups may comprise a first group associated with a first subset of synonyms and a second group associated with a second subset of the synonyms, wherein each customer is associated with one of the groups. The logic circuitry may associate a first unique tag with the first group and with each of the synonyms of the first subset. The logic circuitry may associate a second unique tag with the second group and with each of the synonyms of the second subset. The first subset and the second subset may comprise unique subsets. The logic circuitry may also associate one or more models with pairs of the groups, a first pair of the pairs to comprise the first group and the second group, a first model of the models associated with the first pair. And the first model may replace at least a first synonym of the first subset with a second synonym of the second subset in a first communication from a first customer of the first group to a second customer of the second group.

Another embodiment may comprise a non-transitory storage medium containing instructions, which when executed by a processor, cause the processor to perform operations. The operations may form a first group with a first subset of customers and a second group with a second subset of the customers; wherein the first subset of the customers and the second subset of the customers are mutually exclusive. The operations may associate a first unique tag with the first group and with a first subset of synonyms. The operations may associate a second unique tag with the second group and with a second subset of the synonyms. The operations may train at least one model to replace synonyms in communications between the first group and the second group based on customer data associated with the first group and the second group. And the operations may replace, by the at least one model, at least a first synonym from the first subset of synonyms with a second synonym from the second subset of synonyms in a first communication from a first customer of the first subset of customers to a second customer of the second subset of customers.

Yet another embodiment may comprise a system. The system may comprise memory and logic circuitry coupled with the memory. The logic circuitry may provide database including a set of synonyms, each of the synonyms associated with one or more tags, each of the tags associated with one or more nodes of the database. The logic circuitry may also receive, via an application programming interface (API), an instruction to replace one or more words in a document drafted in a text editor, identification of an author of the document, and identification of a recipient of a document. The logic circuitry may identify a first tag associated with the identification of the recipient and a second tag associated with the identification of the author. The logic circuitry may select a model based on an association between the first tag, the second tag, and the model. The logic circuitry may process, via the API, text of the document to identify the one or more words associated with the second tag to identify one or more candidates for replacement. The logic circuitry may identify, by the model, synonyms associated with the first tag to replace the one or more words and replace, via the API, the one or more words with the synonyms by the model.

BRIEF DESCRIPTION OF THE DRAWINGS

FIGS. 1A-C depict embodiments of systems including servers, networks, data servers, and software applications to adjust communications;

FIGS. 3A-E depict flowcharts of embodiments to adjust communications, by adjust logic circuitry, such as the adjust logic circuitry shown in FIGS. 1A, 1B, 1D, 1F, and 2;

DETAILED DESCRIPTION OF EMBODIMENTS

Figure 1E:
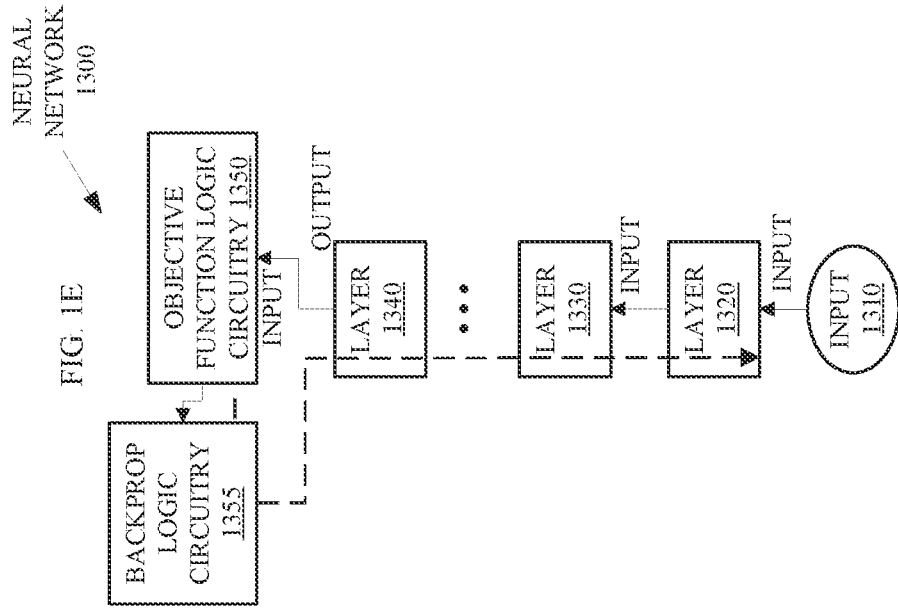
FIGS. 1D-E depict embodiments of an apparatus and a neural network of a model, such as the servers and models in illustrated in FIG. 1A.

The following is a detailed description of embodiments depicted in the drawings. The detailed description covers all modifications, equivalents, and alternatives falling within the appended claims.

Embodiments discussed herein can generally improve communications between an author and one or more recipients by application of knowledge about the recipient(s) and, in many embodiments, by application of knowledge about the author. Communications referenced herein refer to any type of textual communications such as text messages, emails, chats in a chat room or chat box, writings, essays, reports, technical papers, books, e-books, and any other communications that include text. Text refers to combinations of words in any form such as words character form, graphical representations of words, emojis, short hand, abbreviations, slang, and/or the like.

Embodiments may adjust communications by replacement of one or more words in communications between one or more authors and one or more recipients with synonyms more conducive to correct understanding by the recipient(s). Many embodiments select words in communications to replace with synonyms based on information known about the recipient(s) of the communications. Some embodiments replace words in communications based on known differences in the backgrounds of the author(s) and the recipient(s). Some embodiments replace words in communications based on assumed differences in the backgrounds of the author(s) and the recipient(s). For instance, some embodiments may assume a high school level or college level of education for recipient(s) for whom the embodiment has no customer data. Further embodiments, may assume a dialect of recipient(s) for whom the embodiment has no knowledge or has minimal customer data about the geographical location of the recipient(s).

For convenience, authors and recipients discussed herein are referred to as customers and information about such customers is referred to as customer data. Customer data may refer to communications by a customer such as writings, papers, chats, texts, and/or the like. Customer data may also refer to background information such as publicly or privately available information including, e.g., social media, chat rooms, Internet forums, customer profiles, credit reports, background checks, information presented in web sites, and/or the like.

Some embodiments begin with a simplistic model that clusters customers in groups or otherwise forms groups of customers that identifies differences between the customers such as educational level, geographical location, income level, occupation, and/or the like to identify likely differences between the customers in terms of vocabulary and/or dialects. For example, a customer in the United States may communicate with a customer in the United Kingdom. Dictionaries outline differences in word choices between these customers. In such communications, some embodiments may replace words in communications from the customer in the United States with synonyms likely more understandable by the customer in the United Kingdom.

Further embodiments may support more granularity based on information known about the customer in the United Kingdom and the customer in the United States such as dialects typically found in certain regions of the United States and dialects found in certain regions of the United Kingdom. Such embodiments may replace a word that is a dialect, in the communications authored by the customer in the United States, with a synonym that is a dialect in the United Kingdom. Synonyms as discussed herein are any words that are considered by an embodiment to have equivalent or similar meanings and may be implementation specific and/or customizable. For instance, an embodiment may use one or more particular dictionaries to identify synonyms and the embodiments may associate the synonyms with data structures, tags, and/or the like.

In some embodiments, a set of synonyms may be provided. The set of synonyms may include multiple subsets and each of the subsets of the synonyms may be associated with one of the groups or nodes. Such embodiments may associate customers with the groups or nodes based on customer data associated with each of the customers. Other embodiments may cluster the customers into groups and associate subsets of the synonyms with the groups based on customer data associated with each of the groups.

Further embodiments may learn, based on training through natural language processing, words that have equivalent or similar meanings. Some embodiments may learn words that have equivalent or similar meanings through analyses of customer data associated with customers clustered into the same group. Several embodiments may implement some combination of synonyms provided and synonyms learned, and such learning may occur prior to deployment of such embodiments and/or after deployment.

Some embodiments may implement natural language processing in models by vectorizing words in customer data and analyzing the customer data to, e.g., cluster customers into groups or nodes based on subsets of synonyms associated with or assigned to the groups or nodes. Other embodiments may associate selected synonyms with the groups or nodes.

As discussed herein, many embodiments associate a unique tag with each group of customers. The unique tag may be any type of link, designation, or other association that can distinguish one group of customers from another group of customers. Several embodiments associate the unique tag with each customer within the group. Furthermore, in some embodiments, an association between a customer and a group is dynamic. In other words, embodiments may move customers from one group to another based on customer data subsequently collected about the customer such as communications authored by the customer and/or updated customer data obtained from public sources or other sources.

To illustrate, a customer may be known to live in a particular region that one embodiment associates with a particular dialect. In communications with that customer, the customer may provide feedback that is inconsistent with the assumption that the customer understands the particular dialect well. For instance, the customer may have recently relocated into that region from another region associated with a different dialect. Some embodiments track feedback to determine an error rate associated with replacement of synonyms in communications with that customer. After one or more instances of feedback indicate an inconsistency with the assumption that the customer understands the particular dialect, such embodiments may determine an error rate associated with the customer that exceeds a threshold for the error rate. Based on the error rate exceeding the threshold, such embodiments may determine that the customer should be associated with a different group of customers and may change the unique tag associated with the customer to a different unique tag that associates the customer with a different group of customers.

Furthermore, an embodiment may track movement of customers between groups. If one customer or multiple customers move between one or more different groups of customers, the embodiment may determine that the one customer or multiple customers do not understand well or misunderstand synonyms in each of the subsets of synonyms associated with existing groups of customers. In response to such a determination, the embodiment may determine a need for a new group of customers. Some embodiments may automatically generate a new node and train one or more models based on the customer data associated with the customers being moved to the new node. Other embodiments may output a report that indicates a need for a new node along with information related to the new node. The information related to the new node may indicate, e.g., the one customer or multiple customers and, in some embodiments, a suggested category of synonyms or a specific subset of synonyms that the one customer or multiple customers understand based on the feedback.

Many embodiments may associate a unique tag with a subset of synonyms and assign the unique tag to each of the customers in the group to associate the group of customers with the subset of synonyms. Other embodiments may associate the unique tag of a group of customers with a subset of synonyms for use in communications associated with that group of customers.

The subset of synonyms may be one of multiple subsets of synonyms that form a set of synonyms. In other words, the set of synonyms may represent all the synonyms that an embodiment may use for replacement of words in communications between customers. In some embodiments, the set of synonyms may reside in a single database or in each instantiation of the single database. In other embodiments, the set of synonyms may reside in multiple databases as multiple subsets of the set of synonyms.

Furthermore, the subsets of synonyms may overlap. For instance, customers grouped based on education level may include, e.g., a doctorate level group, college level group, a high school level group, a middle school level group, an elementary level group, one or more groups with particular technical proficiencies, and/or other groups. The customers in the high school level group and the college level group may share an understanding of many of the same synonyms but may also not share the same understanding of at least some of the synonyms in the set of synonyms. As a result, the high school level group and the college level group may associate with different subsets of synonyms that include some of the same synonyms.

Embodiments may organize and implement adjustments to communications via different methodologies related to the complexity and granularity of the embodiments. The complexity of the embodiments may relate to the number of groups implemented for the embodiments, the number of customers involved, the extent of the customer data known or collected about customers that is available to the embodiment in a customer dataset, and/or the like. Some embodiments may implement a simple database structure that clusters customers into, e.g., two groups, associates each group with a subset of synonyms, and replaces synonyms in communications via, e.g., a dictionary or a bag of words.

Other embodiments may implement between 10 and 1000 groups in a more complex database structure. The combination of the database structure and the one or more models to adjust communications is referred to herein as adjust logic circuitry. Adjust logic circuitry may comprise a combination of hardware and code such as processor circuitry, hard-coded logic, instructions executable in the processor circuitry, memory for short-term and/or long-term storage of instructions and data, and/or the like.

The adjust logic circuitry may implement a relational database in some embodiments and a graph database in other embodiments. The relational database may include a set of customers, a set of groups or nodes, a synonym dataset, and, in some embodiments, a set of word vectors. A model may comprise an algorithm, a statistical model, or a neural network. The adjust logic circuitry may identify a word existing in a communication to replace and the model may select a synonym associated with a group of customers to replace the word existing in the communication. Tags may associate each of the customers with a group of customers and each group of customers with a subset of synonyms.

The graph database may comprise nodes with edges and each edge of a node may interconnect the node with another node via one or more models. For instance, in some embodiments, a high school level group may comprise a first node and a college level group may comprise a second node. The first node may interconnect with the second node through a model that replaces words in communications with synonyms for communications from the first node to the second node and/or from the second node to the first node. In further embodiments, the first node may interconnect with the second node through two or more models. A first model or set of models may replace words in communications with synonyms for communications from the first node to the second node and a second model or set of models may replace words with synonyms in communications from the second node to the first node. For embodiments that implement more than one model for communications from the first group to the second group, each model may train to replace different categories of synonyms such as education level related synonyms, dialect related synonyms, and/or the like.

The communications may be text in electronic form or in any form that can be converted to electronic form so many embodiments comprise one or more application programming interface(s) (APIs) that allow an author to interact with the adjust logic circuitry to replace words in communications. For instance, the API may be automatically called for each recipient of a communication or each group of customers associated with a communication. In further embodiments, the author may call the adjust logic circuitry via the API by selecting a button associated with the API in, e.g., a text editor, word processing application, presentation software, and/or any other software application that can create and/or transmit a communication from the author to a recipient.

Many embodiments that employ APIs, such as APIs for email programs, create an instance of the communication for each customer group associated with the communication. For instance, if an email is addressed to customers from two different groups of customers, the adjust logic circuitry may create an instance of the email for each group of customers and associate the appropriate email addresses for those customers with the corresponding instance of the email. For each instance of the email, the adjust logic circuitry may execute the model associated with the interconnection between the node of the author(s) and the node of the recipient(s). Other embodiments may integrate the adjust logic circuitry with a software application such as an email program, a text editor, a word processor, a presentation software application, and/or the like.

In some embodiments, the API can automatically capture feedback from a recipient based on natural language processing of one or more emails from one of the recipients of a communication. In other embodiments, the API may rely on the author providing feedback to the adjust logic circuitry.

Several embodiments comprise systems with multiple processor cores such as central servers, modems, routers, switches, servers, workstations, netbooks, mobile devices (Laptop, Smart Phone, Tablet, and the like), and the like. In various embodiments, these systems relate to specific applications such as healthcare, home, commercial office and retail, security, industrial automation and monitoring applications, financial services, and the like.

Turning now to the drawings, FIGS. 1A-C depict embodiments of systems including servers, networks, data servers, and word processing applications to adjust communications. FIG. 1A illustrates an embodiment of a system 1000. The system 1000 may represent a portion of at least one wireless or wired network 1020 that interconnects server(s) 1010 with data server(s) 1050. The at least one wireless or wired network 1020 may represent any type of network or communications medium that can interconnect the server(s) 1010 and the data server(s) 1050, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a company that provides services. In some embodiments, the server(s) 1010 represent more than one company that provides services. For example, a first set of one or more server(s) 1010 may provide services including identifying a set of synonyms for replacement of words in communications for groups of customers including, in some embodiments, indications of education levels and/or dialects associated with each of the synonyms. A second set of one or more server(s) 1010 may associate subsets of the set of synonyms with each of the nodes 1016 and 1018 via adjust logic circuitry 1015. The adjust logic circuitry 1015 may identify words in communications from customers associated with node 1016 to customers associated with node 1018 that are also included in the set of synonyms and in a subset of synonyms associated with the node 1018 and vice versa.

The model(s) 1017 may comprise algorithms or machine learning models such as statistical models, neural networks or other machine learning models. In many embodiments, the model(s) 1017 may predict a synonym to replace a word in a communication, determine a probability of a synonym to replace word in the communication, select a synonym to replace a word in the communication based on one or more values associated with the synonym, calculate a value to identify a synonym to replace a word in the communication, and/or the like. The methodology of the models may depend on the implementation. The methodology of the model(s) 1017 may refer to the model type such as a linear model, a non-linear model, and/or a deep learning model. An example of a linear model may be a logistic regression engine. An example of a non-linear model may be a gradient boosting engine. And an example of a deep learning model may be a deep learning neural network.

In the present embodiment, the adjust logic circuitry 1015 comprises a simple implementation of a graph database. The graph database comprises two nodes, nodes 1016 and 1018, with a single interconnection between the nodes that is associated with the model(s) 1017. Each node 1016 and 1018 may comprise a database including a group of customers. For instance, the node 1016 may represent an Information Technology group of customers and the node 1018 may represent customers associated with a high school level group. While the customers associated with a high school level group may have varying levels of education, the Information Technology group may adjust communications with their clients via the adjust logic circuitry 1015 to address the broadest possible audience of clients of the Information Technology group and to improve understanding of communications from their clients.

The group of customers associated with the node 1016 may include each customer representative of the Information Technology group and the group of customers associated with the node 1018 may include each of the clients of the Information Technology group. When a client submits a request for technical support, the adjust logic circuitry 1015 may identify the client as a customer associated with the node 1018 and identify the recipient of the communication as a customer representative associated with the node 1016. The adjust logic circuitry 1015 may also identify the model(s) 1017 as the interconnection from an edge of the node 1018 to an edge of the node 1016. In response to identification of the model(s) 1017 as the interconnection from an edge of the node 1018 to an edge of the node 1016, the model(s) 1017 may replace words included the communication authored by the client with synonyms from a subset of synonyms associated with the node 1016. In particular, the model(s) 1017 may receive, as input, words or word vectors from the communication, depending on the model type of the model(s) 1017. In some embodiments, the adjust logic circuitry 1015 may parse the words from the text of the communication and search for a matching word in the set of synonyms or in the subset of synonyms associated with the node 1018. The adjust logic circuitry 1015 may provide the words that match synonyms in the set of synonyms as input to the model(s) 1017 and the model(s) 1017 may select replacement synonyms for the words based on the subset of synonyms associated with the node 1016.

In some embodiments, the model(s) 1017 may associate values with synonyms in the subset of synonyms associated with the node 1016 based on feedback from the customer representative. For example, if the subset of synonyms associated with the node 1016 includes multiple possible synonyms that are equivalent to a word in the communication, the model(s) 1017 may adjust values, such as values between zero and one, for each word replacement that results in negative feedback from the customer representative. In one embodiment, the values may reflect or be related to error rates associated with use of the synonyms as a replacement for a word in the communication and, based on the values, the model(s) 1017 may select between equivalent or similar synonyms in the subset of synonyms associated with the node 1016.

In other embodiments, the adjust logic circuitry 1015 may identify the words in the communication that are also included in the set of synonyms, convert the text of one or more sentences about each of the words identified into word vectors, perform a sentence analysis on each of the one or more sentences, and input the results of the sentence analysis along with the word vectors of each of the words identified as input to the model(s) 1017. The sentence analysis, for instance, may involve a summation of the word vectors of words in each sentence, one or more convolutions of the word vectors of words in the one or more sentences, and/or other mathematical processing of the word vectors of words in the one or more sentences. The model(s) 1017 may select a synonym for one or more of the words identified from the subset of synonyms associated with the node 1016 based on the identified words and the sentence analysis provided as input to the model(s) 1017.

In still another embodiment, the adjust logic circuitry 1015 may identify one or more of the words in the communication that are also included in the set of synonyms, convert the text of all the sentences in the communication into word vectors, perform a sentence analysis on the sentences, perform a communication analysis based on the sentence analysis, and input the results of the communication analysis along with the word vectors of the one or more words identified as input to the model(s)s 1017. The model(s) 1017 may then select a synonym for one or more of the words identified from the subset of synonyms associated with the node 1016 based on the identified words and the communication analysis provided as input to the model(s) 1017.

Thereafter, the adjust logic circuitry 1015 may replace the words in the communication with the synonyms from the subset of synonyms associated with the node 1016 before delivery of the communication to the customer representative of the Information Technology group. In some embodiments, the adjust logic circuitry 1015 may present the altered communication to the client for approval of the word replacements prior to delivery of the communication to the customer representative.

When the customer representative responds to the client, the communication from the customer representative may be adjusted in a similar manner by the model(s) 1017 to replace one or more words with synonyms from the subset of synonyms associated with the node 1018. In one embodiment, the model(s) 1017 include one model to replace words in a communication authored by a customer associated with the node 1016 and directed towards a customer associated with the node 1018, and a second model to replace words in a communication authored by a customer associated with the node 1018 and directed towards a customer associated with the node 1016.

Prior to implementation of the adjust logic circuitry 1015 to adjust communications between the customers associated with the nodes 1016 and 1018, the adjust logic circuitry 1015 may train the model(s) 1017 with customer data for the groups of customers associated with the nodes 1016 and 1018. For instance, the adjust logic circuitry 1015 may have access to a training dataset and a testing dataset for the model(s) 1017 in the customer dataset 1054 of the database 1052 on the data server(s) 1050.

To illustrate, the adjust logic circuitry 1015 may retrieve part of or all the customer dataset 1054 to store locally with the server(s) 1010 for use as training and testing datasets and designate portions of the customer dataset 1054 for training data and portions of the customer dataset 1054 for testing data. In some embodiments, the adjust logic circuitry 1015 may access the customer dataset 1054 from the data server(s) 1050 as needed and may cache some of the customer dataset 1054 locally in the server(s) 1010.

In some embodiments, the training dataset and testing dataset may include multiple communications authored by one or more of the customers associated with the node 1016 and one or more of the customers associated with the node 1018. In some embodiments, the training dataset and testing dataset may include background information about one or more of the customers associated with the node 1016 and one or more of the customers associated with the node 1018. In further embodiments, the training dataset and testing dataset may include background information about and communications authored by one or more of the customers associated with the node 1016 and one or more of the customers associated with the node 1018. For instance, the model(s) 1017 may train to associate values with synonyms or for other machine learning based on usage of the synonyms in prior communications by the customers included in the customer dataset 1054.

FIG. 1B depicts an embodiment for an apparatus 1100 such as one of the server(s) 1010 shown in FIG. 1A. The apparatus 1100 may be any form of computer and may combine with any suitable embodiment of the systems, devices, and methods disclosed herein. The apparatus 1100 may include adjust logic circuitry 1110 such as the adjust logic circuitry 1015 in FIG. 1A to replace words in a document 1130 as well as processing circuitry to execute code associated with a software application 1120 and an API 1115. The apparatus 1100 may also include a non-transitory storage medium to store the document 1130.

The software application 1120 may comprise an application to create and/or edit a communication such as the document 1130. The API 1115 may provide an interface between the adjust logic circuitry 1110 and the software application 1120 to facilitate generation of an instance of the document 1130 for the adjust logic circuitry 1110. The adjust logic circuitry 1110 may parse the document into words, identify the words of the document that correspond to synonyms in a set of synonyms 1112, and replace one or more of the words identified with synonyms from a subset 1114 of the set of synonyms 1112. In some embodiments. the adjust logic circuitry 1110 may adjust the document 1130 via the API 1115. In other embodiments, the adjust logic circuitry 1110 may adjust multiple instances of the document 1130 to create a version of the document 1130 for each of multiple subsets of the synonyms, respectively. For instance, a customer may draft the document and select the API 1115 to create versions of the document for one or more audiences such as by designating one or more attributes of the designated audiences. The one or more attributes may include an education level, a dialect, an occupation, a technical proficiency, a geographical location, and/or the like. In the present embodiment, the user may select one or more customers as recipients of the document 1130. The adjust logic circuitry 1110 may identify each of the designated recipients as part of one or more groups of customers. For each group of customers associated with the one or more recipients, the adjust logic circuitry 1110 may generate an instance of the document 1130 as a communication for the group of customers. In other embodiments, the adjust logic circuitry 1110 may generate an instance of the document for each of the one or more recipients.

FIG. 1C depicts an embodiment of the software application 1120 shown in FIG. 1B. In the present embodiment, the software application 1120 creates an instance of the document 1130 referred to as an adjusted document 1160 via the adjust logic circuitry 1110 and the API 1115.

After selecting words of the document 1130 to replace, the adjust logic circuitry 1110 may interact with the software application 1120 to create the adjusted document 1160 based on the subset of synonyms 1114 associated with a recipient of the adjusted document 1160. In particular, the adjust logic circuitry 1110 may parse the text of the document 1130 to identify words of the text of the document 1130 that correspond to synonyms in the set of synonyms 1112. The words identified in the text are designated the synonym 1134, the synonym 1138, and the synonym 1142. The remainder of the words in the text of the document 1130 are designated as the words 1132, 1136, and 1140 and the words 1132, 1136, and 1140 may not correspond to synonyms in the set of synonyms 1112.

Thereafter, the adjust logic circuitry 1110 may generate the adjusted document 1160 by replacing the synonyms 1134 and 1138 with alternate synonyms 1164 and 1168, respectively. The alternate synonyms 1164 and 1168 may be from the subset 1114 of the set of synonyms 1112 that is associated with the recipient of the adjusted document 1160. If, for instance, a word, designated as the synonym 1142, from the text of the document 1130, that is identified as being in the set of synonyms 1112, does not have a corresponding synonym in the subset 1114, many embodiments do not replace the word with an alternate synonym.

Figure 1D:
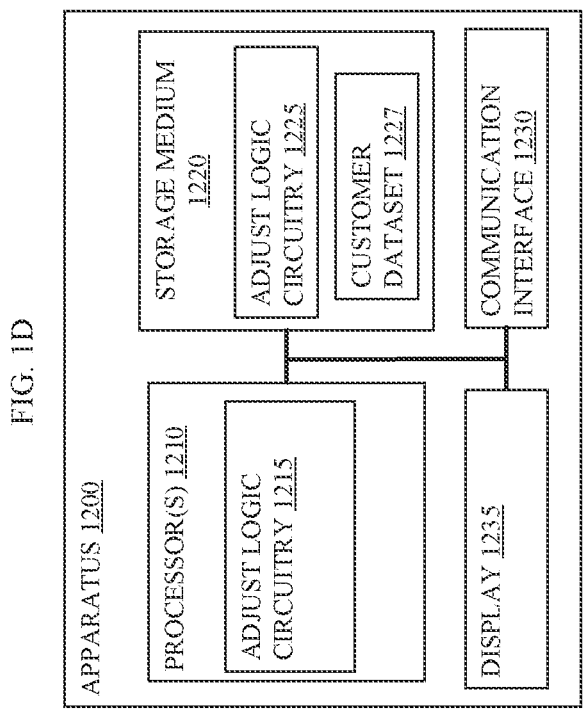

FIGS. 1D-E depict embodiments of an apparatus and a neural network of a model, such as the models in illustrated in FIG. 1A. FIG. 1D depicts an embodiment for an apparatus 1100 such as one of the server(s) 1010 shown in FIG. 1A. The apparatus 1200 may be a computer in the form of a smart phone, a tablet, a notebook, a desktop computer, a workstation, or a server. The apparatus 1200 can combine with any suitable embodiment of the systems, devices, and methods disclosed herein. The apparatus 1200 can include processor(s) 1210, a non-transitory storage medium 1220, communication interface 1230, and a display device 1235. The processor(s) 1210 may comprise one or more processors, such as a programmable processor (e.g., a central processing unit (CPU)). The processor(s) 1210 may comprise processing circuitry to implement adjust logic circuitry 1215 such as the adjust logic circuitry 1015 in FIG. 1A.

The processor(s) 1210 may operatively couple with a non-transitory storage medium 1220. The non-transitory storage medium 1220 may store logic, code, and/or program instructions executable by the processor(s) 1210 for performing one or more instructions including the adjust logic circuitry 1225. The non-transitory storage medium 1220 may comprise one or more memory units (e.g., removable media or external storage such as a secure digital (SD) card, random-access memory (RAM), a flash drive, a hard drive, and/or the like). The memory units of the non-transitory storage medium 1220 can store logic, code and/or program instructions executable by the processor(s) 1210 to perform any suitable embodiment of the methods described herein. For example, the processor(s) 1210 may execute instructions such as instructions of the adjust logic circuitry 1225 causing one or more processors of the processor(s) 1210 represented by the adjust logic circuitry 1215 to adjust a communication. The processor(s) 1210 may adjust the communication via a model such as the model(s) 1017 of the adjust logic circuitry 1215, based on an association of a recipient of the communication with a first subset of synonyms such as the subset 1114 shown in FIG. 1B. The adjust logic circuitry 1215 may analyze the communication to generate a list of synonyms in the communication that correspond to synonyms in a set of synonyms or a second subset of synonyms that may be associated with the author of the communication. The adjust logic circuitry 1215 may replace the words identified as part of the set of synonyms, or the second subset of synonyms, with synonyms from the first subset of synonyms to adjust the communication for the recipient.

Once the recipient receives the communication, the recipient or the author may provide feedback to the adjust logic circuitry 1215. The adjust logic circuitry 1215 may train a model of the adjust logic circuitry 1215 based on the feedback. In some embodiments, the adjust logic circuitry 1215 may train the model via negative feedback and/or calculate an error rate or update an error rate calculation based on the feedback. In further embodiments, the adjust logic circuitry 1215 may train the model with positive feedback or both positive and negative feedback.

In response to a determination of an error rate associated with replacement of words with synonyms in the communication, the adjust logic circuitry 1215 may cause the error rates associated with one or more customers to output on a display device 1235. In further embodiments, the adjust logic circuitry 1215 may cause a report with the error rates to transmit to another device or server or to a printer via the communication interface 1230.

The non-transitory storage medium 1220 may store code and data for the adjust logic circuitry 1225 and store a customer dataset 1227 such as the customer dataset 1054 shown in FIG. 1A. In many embodiments, the customer dataset 1227 includes customer data such as communications and background information to train one or more models of the adjust logic circuitry 1215. In some embodiments, memory units of the non-transitory storage medium 1220 may store data related the customers associated with the adjust logic circuitry 1215 such as error rates and historical changes in group associations of each of the customers.

The processor(s) 1210 may couple to a communication interface 1230 to transmit and/or receive data from one or more external devices (e.g., a terminal, display device, a smart phone, a tablet, a server, a printer, or other remote device). The communication interface 1230 includes circuitry to transmit and receive communications through a wired and/or wireless media such as an Ethernet interface, a wireless fidelity (Wi-Fi) interface, a cellular data interface, and/or the like. In some embodiments, the communication interface 1230 may implement logic such as code in a baseband processor to interact with a physical layer device to transmit and receive wireless communications such as transaction data from a server or an instance of a neural network of the adjust logic circuitry 1215. For example, the communication interface 1230 may implement one or more of local area networks (LAN), wide area networks (WAN), infrared, radio, Wi-Fi, point-to-point (P2P) networks, telecommunication networks, cloud communication, and the like.

FIG. 1E depicts an embodiment of a neural network (NN) 1300 of an adjust logic circuitry, such as the model(s) 1017. The NN 1300 may comprise as a deep neural network (DNN).

A DNN is a class of artificial neural network with a cascade of multiple layers that use the output from the previous layer as input. An example of a DNN is a recurrent neural network (RNN) where connections between nodes form a directed graph along a sequence. A feedforward neural network is a neural network in which the output of each layer is the input of a subsequent layer in the neural network rather than having a recursive loop at each layer.

Another example of a DNN is a convolutional neural network (CNN). A CNN is a class of deep, feed-forward artificial neural networks. A CNN may comprise of an input layer and an output layer, as well as multiple hidden layers.

The hidden layers of a CNN typically consist of convolutional layers, pooling layers, fully connected layers, and normalization layers.

The NN 1300 comprises an input layer 1310, and three or more layers 1320 and 1330 through 1340. The input layer 1310 may comprise input data that is training data for the NN 1300 or at least part of a communication for which the NN 1300, in inference mode, will identify synonyms to replace words of the communication. The input layer 1310 may provide the customer data in the form of tensor data to the layer 1320. The tensor data may include a vector, matrix, or the like with values associated with each input feature of the NN 1300. In many embodiments, the input data may comprise one or more words to replace in the communication. In some embodiments, the input data may include information about the communication or part of the communication along with one or more words to replace in the communication.

The customer data may comprise various types of information related to a communication from a first customer associated with a first group or node to a second customer associated with a second group or node. The information may include, e.g., historical communications from customers associated with the first group or node to the customers associated with the second group or node, background information about customers associated with the first group or node and customers associated with the second group or node, and/or the like.

In many embodiments, the input layer 1310 is not modified by backpropagation. The layer 1320 may compute an output and pass the output to the layer 1330. Layer 1330 may determine an output based on the input from layer 1320 and pass the output to the next layer and so on until the layer 1340 receives the output of the second to last layer in the NN 1300. Depending on the methodology of the NN 1300, each layer may include input functions, activation functions, and/or other functions as well as weights and biases assigned to each of the input features. The weights and biases may be randomly selected or defined for the initial state of a new model and may be adjusted through training via backwards propagation (also referred to as backpropagation or backprop). When retraining a model with customer data obtained after an initial training of the model, the weights and biases may have values related to the previous training and may be adjusted through retraining via backwards propagation.

The layer 1340 may generate an output, such as a representation of a synonym to replace a word in the communication and/or a probability associated with the synonym, and pass the output to an objective function logic circuitry 1350. The objective function logic circuitry 1350 may determine errors in the output from the layer 1340 based on an objective function such as a comparison of the predicted results against the expected results. For instance, the expected results may be paired with the input in the training data supplied for the NN 1300 for supervised training. In one embodiment, for example, the predicted results may include one or more replacement synonyms for a communication and the expected results may include synonyms from a subset of synonyms associated with a particular group of customers identified as the recipient group for this model. In another embodiment, the expected results may comprise synonyms found in historical communications attributable to the particular group of customers.

During the training mode, the objective function logic circuitry 1350 may output errors to backpropagation logic circuitry 1355 to backpropagate the errors through the NN 1300. For instance, the objective function logic circuitry 1350 may output the errors in the form of a gradient of the objective function with respect to the input features of the NN 1300.

The backpropagation logic circuitry 1355 may propagate the gradient of the objective function from the top-most layer, layer 1340, to the bottom-most layer, layer 1320 using the chain rule. The chain rule is a formula for computing the derivative of the composition of two or more functions. That is, if f and g are functions, then the chain rule expresses the derivative of their composition f∘g (the function which maps x to f(g(x))) in terms of the derivatives of f and g. After the objective function logic circuitry 1350 computes the errors, backpropagation logic circuitry 1355 backpropagates the errors. The backpropagation is illustrated with the dashed arrows.

When operating in inference mode, the adjust logic circuitry, such as the adjust logic circuitry 1215 shown in FIG. 1D, may receive feedback related to replacement of words in a communication with synonyms associated with a group and, in some embodiments, the feedback may identify one or more sentences of the communication that include the synonyms in the form of word vectors or a sentence analysis of the word vectors for each of the one or more sentences. If the feedback is negative, the backpropagation may attribute an error to the replacement. If the feedback is positive, the backpropagation may reinforce or bias selection of the replacement within the layers of the NN 1300.

Figure 1G:
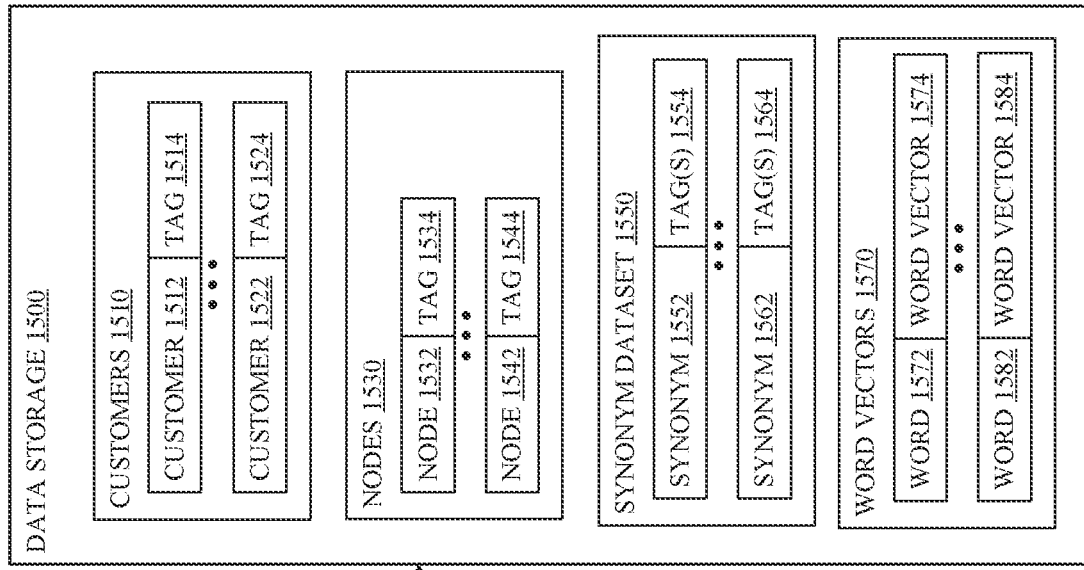
FIGS. 1F-G depict embodiments of logic circuitry including a database and a data storage to adjust communications with models, such as the logic circuitry and models in illustrated in FIG. 1A.
Figure 1F:
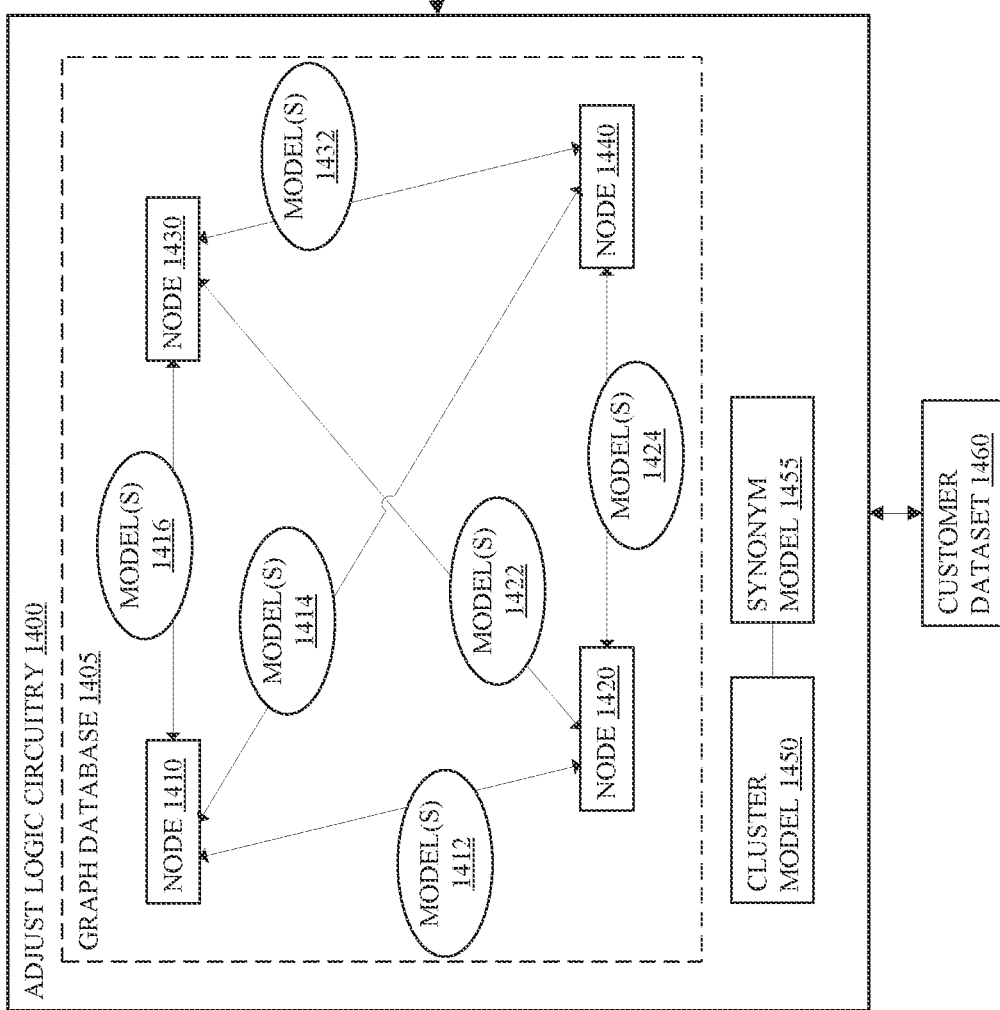

FIGS. 1F-G depict embodiments of adjust logic circuitry 1400 including a graph database 1405 and a data storage 1500 to adjust communications with models 1412, 1414, 1416, 1422, 1424, and 1432, such as the model(s) 1017 in illustrated in FIG. 1A. The graph database 1405 of adjust logic circuitry 1400 illustrates an alternative database to the database illustrated in FIG. 1A that has more nodes and more interconnections. Note that embodiments are not limited to a particular number of nodes and models but can comprise any number of nodes and models. The limitation with respect to the number of nodes and models relates to a balance between the amount of data storage and diminishing returns associated with the granularity of attributes associated with the customer groups. The attributes may comprise, e.g., different levels of education, different regional dialects, and/or a combination thereof. The granularity of attributes associated with customer dataset 1460 may also effectively limit the number of nodes and customer groups.

In many embodiments, the number of nodes is provided and the synonyms associated with each of the nodes is provided. The adjust logic circuitry 1400 may receive a set of nodes and each node may be associated with specified attributes such as one or more levels of education, one or more dialects, and/or the like. In particular, the adjust logic circuitry 1400 may provide a synonyms dataset 1550 with multiple synonyms 1552 through 1562 and each of the synonyms 1552 through 1562 may be designated via tag(s) 1554 through 1564, respectively, to associate each of the synonyms 1552 through 1562 with a particular regional dialect and/or education level. A subset of synonyms from synonym dataset 1550 may be provided for each of the nodes based on the specified attributes for each of the nodes 1410, 1420, 1430, and 1440. Thereafter, the adjust logic circuitry 1400 may cluster the customers 1510 with each of the nodes based on the customer dataset 1460 by correlating customer data from the customer dataset 1460 against the subsets of synonyms associated with each of the nodes 1410, 1420, 1430, and 1440. For instance, the adjust logic circuitry 1400 may cluster the customers 1510 with each of the nodes by correlating with the synonym dataset 1550, words in prior communications authored by each of the customers and/or words associated with the background of each of the customers such as level of education, dialect, and/or the like.

In other embodiments, the adjust logic circuitry 1400 may establish attributes associated with each of the nodes 1410, 1420, 1430, and 1440. Such embodiments may implement a cluster model 1450 to separate customers into groups based on a predefined number of nodes and common attributes associated with the customers. In other words, rather than designing nodes with specified attributes for each of the nodes, a designer for the adjust logic circuitry 1400 may provide the synonyms associated with the attributes, and the adjust logic circuitry 1400 may cluster customers into, e.g., four groups with common sets of the attributes based on the distribution of these attributes amongst the customers. The clustering of the customers into four groups may effectively assign attributes to the nodes 1410, 1420, 1430, and 1440 by associating each of the four groups of customers with one of the nodes 1410, 1420, 1430, and 1440.

With the synonym dataset 1550 and a customer dataset 1460 such as the customer dataset 1054 in FIG. 1A, the cluster model 1450 may cluster the customers for, e.g., the four nodes. The cluster model 1450 may cluster customers into four different groups based on usage of synonyms in the customer dataset 1460 and/or background information in the customer dataset 1460 that corresponds to tag(s) associated with the synonyms in the synonym dataset 1550. In such embodiments, the groups of customers associated with each of the nodes 1410, 1420, 1430, and 1440 are based on the distribution of such attributes of amongst the customers represented in the customer dataset 1460 rather than based on pre-established attributes specified for each of the nodes. For instance, a first group may include college level group of customers in one region, a high school level group of customers in a second region, a mixture of college level and high school level group of customers in a third region, and a mixture of high school level and middle school level group of customers in a fourth region. The adjust logic circuitry 1400 may establish these four groups based on a probability distribution of the customer's attributes that indicates that the existing customers generally have attributes within one of these four groups.

In other embodiments, a synonym model 1455 may generate a portion of or all the synonyms in subsets of the synonyms associated with each of the nodes 1410, 1420, 1430, and 1440. For instance, the synonym model 1455 may select or identify synonyms for a subset of synonyms associated with the node 1410 by identifying synonyms in the synonym dataset 1550 that are also found in communications authored by customers associated with the node 1410. In such embodiments, the subset of synonyms associated with each of the nodes 1410, 1420, 1430, and 1440 may comprise synonyms commonly found in communications authored by the customers associated with the nodes 1410, 1420, 1430, and 1440.

Each of the models 1412, 1414, 1416, 1422, 1424, and 1432 may represent an interconnection between edges of the nodes 1410, 1420, 1430, and 1440. In particular, the model(s) 1412 may establish a functional interconnection between the nodes 1410 and 1420 that establishes a process, performed by the model(s) 1412, to replace words in communications between the nodes 1410 and 1420 in a manner discussed in conjunction with FIGS. 1A-1E. Similarly, the model(s) 1414 may establish a functional interconnection between an edge of the node 1410 and an edge of the node 1440. The model(s) 1416 may establish a functional interconnection between an edge of the node 1410 and the node 1430. The model(s) 1422 may establish a functional interconnection between the edges of the nodes 1420 and 1430. The model(s) 1424 may establish a functional interconnection between the edges of the nodes 1420 and 1440 and the model(s) 1432 may establish a functional interconnection between the edges of the nodes 1430 and 1440.

In other embodiments, the graph database 1405 may not include an interconnection between each node and every other node in the graph database 1405. For instance, two groups of the customers associated with the nodes 1410 and 1440 may not communicate with one another and, in such embodiments, the interconnection with the model(s) 1414 may not exist.

The models 1412, 1414, 1416, 1422, 1424, and 1432 may train based on the subset of synonyms associated with each of the nodes 1410, 1420, 1430, and 1440 that interconnect the models. For example, the model(s) 1412 may interconnect the nodes 1410 and 1420 and may train based on a subset of synonyms associated with the node 1410 and a subset of synonyms associated with the node 1420.

In some embodiments, the model(s) 1412 comprise a first model to replace words in communications from customers associated with the node 1410 to customers associated with the node 1420 and a second model to replace words in communications from customers associated with the node 1420 to customers associated with the node 1410. Such embodiments may train the first model and the second model to replace words in communications based on the portions of the customer dataset 1460 associated with customers associated with the node 1410 and portions of the customer dataset 1460 associated with customers associated with the node 1420. For instance, the first model may train to replace synonyms associated with the node 1410 with synonyms associated with the node 1420 and the second model may train to replace synonyms associated with the node 1420 with synonyms associated with the node 1410. In some embodiments, multiple synonyms from one subset of the synonyms comprise at least part of the input for model(s) 1412. In other embodiments, one synonym from one subset of the synonyms may comprise at least part of the input for the models(s) 1412. In still other embodiments, one or more synonyms and analyses of one or more sentences of a communication may comprise at least part of the input to the model(s) 1412.

FIG. 1G depicts a data storage 1500 to store data to facilitate adjustment of communications by adjust logic circuitry such as the adjust logic circuitry shown in FIG. 1F. In some embodiments, the data storage 1500 may represent a local data storage for each node 1410, 1420, 1430, and 1440 that includes the subset of customers 1510 associated with the node and the subset of synonyms in a synonym dataset 1550 associated with each node 1410, 1420, 1430, and 1440. In other embodiments, the data storage 1500 may represent a central data storage that maintains a set of customers 1510 for the nodes 1410, 1420, 1430, and 1440, a set of the nodes 1530, a set of synonyms in a synonym dataset 1550, and, in some embodiments, a set of word vectors 1570.

The customers 1510 may include a set of customers 1512 through 1522 associated with tags 1514 through 1524, respectively. In some embodiments, the tags 1514 through 1524 may associate each of the customers 1512 through 1522 with one of the nodes 1530. In some embodiments, the tags 1514 through 1524 may each include one or more fields to identify an associated node such as a unique number, links to one or more interconnected nodes, links to synonym datasets of linked nodes, links to one or more models that interconnect the node with other nodes, and/or the like. The customers 1512 through 1522 may each include one or more fields that include information that uniquely identifies a customer such as a unique number or code, a link to a customer profile, a customer name, an error rate calculated for the customer, a historical representation of the nodes with which the customer has been associated, and/or the like.

The nodes 1530 may comprise a set of nodes 1532 through 1542 associated with tags 1534 through 1544, respectively. In many embodiments, the nodes 1532 through 1542 are associated with mutually exclusive subsets (or groups) of the customers 1510. For instance, the node 1410 may be associated with a subset of customers 1510 that includes customer 1512. The customer 1512 may only be associated with the node 1410 and may not be associated with the other nodes 1420, 1430, and 1440. In some embodiments, each of the tags 1514 through tag 1524 may include one or more fields to identify an associated node such as a unique number, a link to one or more interconnected nodes, a link to synonym datasets of linked nodes, a link to one or more models that interconnect the node with other nodes, and/or the like The synonym dataset 1550 may include a set of synonyms 1552 through 1562 associated with a tag 1554 through a tag 1554, respectively. In some embodiments, the tags 1554 through 1554 may associate each of the synonyms 1552 through 1562 with one of the nodes 1530 and one or more of the customers 1510. Furthermore, each synonym such as the synonym 1552 may include a tag in the tag(s) 1554 that associates the synonym 1552 with another synonym 1562 to identify the words in the synonym dataset 1550 that have equivalent or similar meanings. In many embodiments, the synonym dataset 1550 includes multiple sets of words and each set of words includes one or more synonyms. Note that each of the synonyms 1552 through 1562 may be associated with more than one of the nodes 1530 and, in several embodiments, the synonym dataset 1550 does not necessarily have a unique synonym associated with each of the nodes 1530. In other words, each subset of synonyms associated with a node may be unique based on the combination of the synonyms.

Furthermore, each of the tags 1554 through tag 1554 may include one or more fields to identify an associated node with, e.g., a unique number, to link one or more interconnected nodes, to link to one or more models that interconnect the associated node with other nodes, and/or the like.

The word vectors 1570 may include a set of words 1572 through 1582 along with word vectors 1574 through 1584, respectively. The set of words may comprise words that may be found in communications between customers. The word vectors 1574 through 1584 may include a vectorized representation of each of the words 1572 through 1582, respectively. For example, a word vector may include a set of numbers to uniquely identify each word in a set of words. If the set of words includes 100,000 words, a simple, binary representation of each word may include 99,999 zeros and a single one. In other words, in such embodiments, the placement of the one in the word vector identifies a specific word. Summing the word vectors in a sentence can provide a summation that provides attributes of a sentence.

As another example, word vectors 1570 may include vectors of numbers other than one or zero such as the Word2Vec and Naïve Bayes. These alternative word vectors offer additional analysis tools for sentence analyses. Such sentence analyses may form an input tensor for a machine learning model such as a neural network to facilitate processing of synonym usage in the customer data. The sentence analyses may facilitate an informed selection of synonyms by models to replace words in communications between the customers 1510. In other embodiments, the context of a communication may be represented by inclusion of multiple synonyms in an input to tensor for the models.

Figure 2:
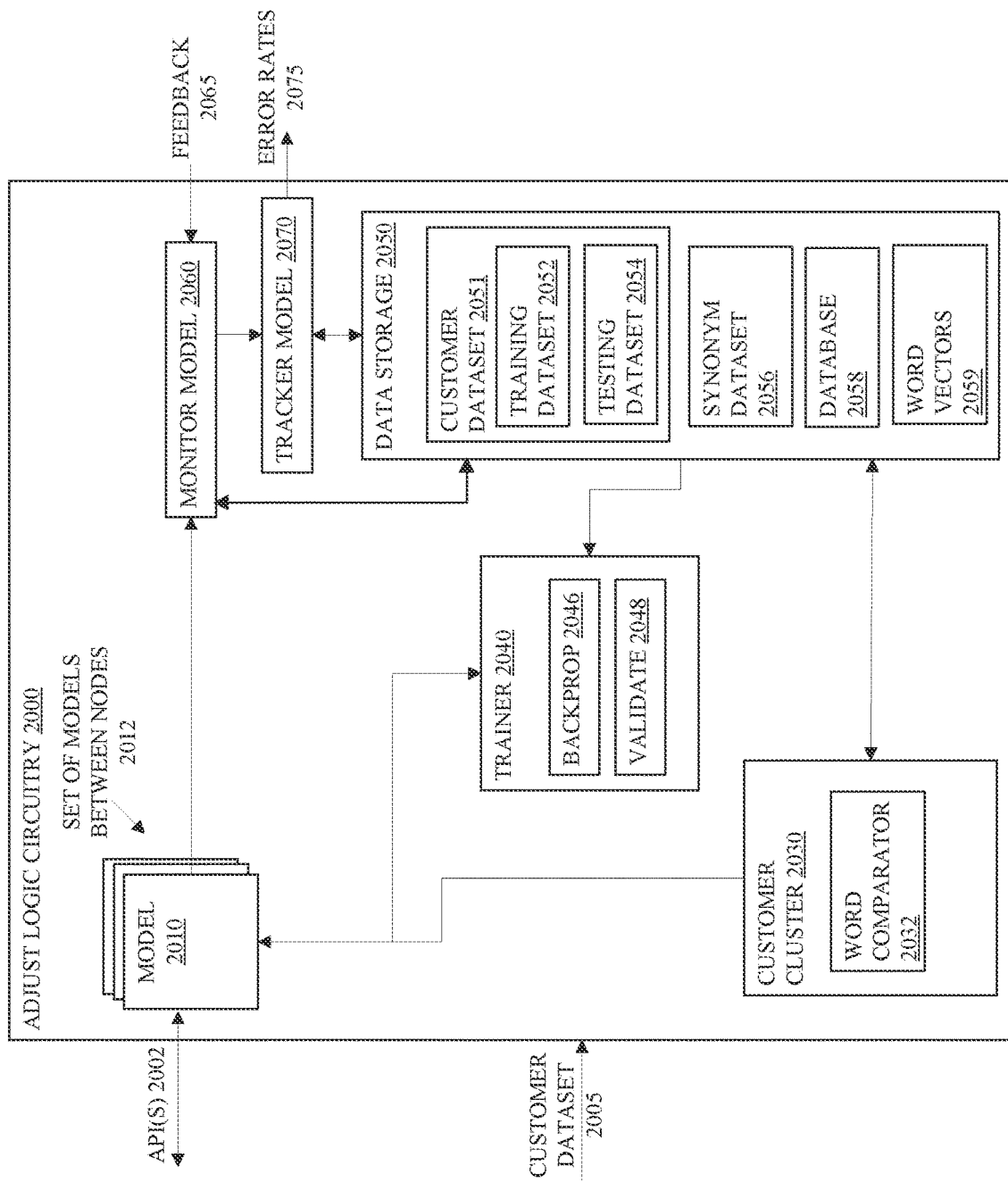
FIG. 2 depicts an embodiment of adjust logic circuitry, such as the adjust logic circuitry shown in FIGS. 1A, 1B, 1D, and 1F.

FIG. 2 depicts an embodiment of adjust logic circuitry 2000, such as the adjust logic circuitry shown in FIGS. 1A, 1B, 1D, and 1F. The adjust logic circuitry 2000 may perform one or more operations to cluster customers into groups; train a set of models 2012, such as the models 1412, 1414, 1416, 1422, 1424, and 1432 illustrated in FIG. 1F; and replace words in communications between groups of customers to adjust communications. The number of models may vary between, e.g., 2 and thousands of models, or may include between, e.g., 50 and 100 models. Note that while the number of models selected for a particular embodiment may affect the granularity with which synonyms can be selected to replace words in communications, the granularity may also be dependent upon the amount of data available in the customer dataset 2005 to train models to distinguish synonym usage between customers, among other factors.

The adjust logic circuitry 2000 may comprise data and logic circuitry such as a set of models 2012, a customer cluster 2030, a trainer 2040, a data storage 2050, a monitor model 2060, and a tracker model 2070. The set of models 2012 may comprise one or more recurrent neural networks, gradient boosting engines, logistic regression engines, statistical models, algorithms, and/or the like, to predict a synonym to replace a word in a communication, which may advantageously attenuate misunderstanding of the communication by a customer associated with a particular group of customers. In some embodiments, the set of models 2012 may comprise instances of the same model, such as the NN 1300 shown in FIG. 1E.

In some embodiments, the adjust logic circuitry 2000 may be provided with a set of synonyms in a synonym dataset 2056. The synonym dataset 2056 may include multiple synonyms and each of the multiple synonyms may be associated with one or more unique tags. Each of the one or more unique tags may identify one of a number (N) different groups or nodes.

With the subsets of synonyms associated with the N groups or nodes, a customer cluster 2030 may to cluster a set of customers into a number (N) subsets (groups) of customers to associate with the N different groups or nodes. For instance, the customer cluster 2030 may process data from a customer dataset 2051 to generate a probability distribution of the customers associated with the customer dataset 2051 based on the association of synonyms with each of the N different groups or nodes. The customer cluster 2030 may then associate customers with the closest of the N different groups or nodes based on the probability distribution. In other words, the customer cluster 2030 may determine a probability that a customer should be associated with a particular one of the N different groups or nodes based on a correlation between the customer data associated with the customer and the synonyms in the synonym dataset 2056. As a result, each customer in a subset of the customers is associated with one of N different groups or nodes to create N mutually exclusive subsets of customers assigned to the N different groups or nodes. In other words, each subset of customers is assigned to a different one of the N different groups or nodes.

In some embodiments, the adjust logic circuitry 2000 may associate a unique tag to each of the N groups or nodes by storing a unique tag in the database 2058 in an entry that associates each unique tag with one of each of the N different groups or nodes to uniquely identify each group or node. The customer cluster 2030 may assign each of the customers listed in the database 2058 with one of the N different groups or nodes by associating the unique tag of one group or node of the N groups or nodes with each of the customers in the subset of customers assigned to that one group or node.

In other embodiments, the adjust logic circuitry 2000 may assign the unique tags to each of the mutually exclusive subsets of the customers and associate each of the unique tags to the each of the N groups or nodes to uniquely identify each of the N groups or nodes with the unique tag.

In further embodiments, the customer cluster 2030 may comprise a word comparator 2032. When the customer dataset 2051 includes communications authored by the set of customers in the database 2058, the word comparator 2032 may compare words from the communications in the customer dataset 2051 with synonyms in a synonym dataset 2056. The comparison may identify synonyms associated with each of the customers that are included in the communications. In some embodiments, the word comparator 2032 may also compare the synonyms of each of the customers in a subset of the customers assigned to the same one of the N different groups or nodes to detect a common subset of the synonyms for the subset of customers. In such embodiments, the customer cluster 2030 may associate each of the synonyms in the common subset of synonyms with a second tag to indicate that the synonyms associated with the second tag belong to a group of synonyms common to communications authored by each of the customers in a subset of the customers.

The set of models 2012 may include different model methodologies depending on the implementation. For instance, the set of models 2012 may comprise any type of algorithm or machine learning model such as a linear, non-linear, or deep learning model. In some embodiments, the set of models 2012 may comprise recurrent neural networks such as the neural network 1300 shown in FIG. 1E.

The set of models 2012 may include models such as the model 2010 to interconnect the N groups or nodes and to adjust communications between subsets of customers associated with the N groups or nodes. While operating in inference mode, the set of models 2012 may receive and modify a communication prior to transmission or distribution via the API(s) 2002. The API(s) may function as an interface with, e.g., a word processing program to edit the communications and store an adjusted communication for an author. The set of models 2012 may determine, based on content of the communication, synonyms to replace words in the communication to advantageously adjust the communication for readability and/or understandability by a customer that is designated as a recipient for the communication. For instance, an author of a communication may be associated with a first subset of customers and a designated recipient for the communication may be associated with a second subset of customers. The adjust logic circuitry 2000 may identify synonyms in the communication based on a comparison of text of the communication with a subset of the synonym dataset 2056 that is associated with the first subset of customers. Thereafter, the adjust logic circuitry 2000 may provide to the input of a model, such as the model 2012, information related to the synonyms and, in some embodiments, information about the context of the communication, the context of sentences in the communication about the synonyms, background information about the author, and/or the like, to provide the model with input data to select replacement synonyms for the communication. The model, which is trained to adjust communications between the first subset of customers and the second subset of customers, may replace synonyms in the communication based on prior training to replace synonyms associated with the author of the communication to synonyms associated with the designated recipient of the communication.

In many of the embodiments, a trainer 2040 may train the set of models with the customer dataset 2051 residing in the data storage 2050. The customer dataset 2051 may include customer data related to the communications authored by and/or background information associated with the author of the communication and/or customers within the same subset of customers as the author of the communication.

The adjust logic circuitry 2000 may receive a customer dataset 2005, or a portion thereof, from a database or other data storage; may associate portions of the customer dataset with a training dataset 2052 and a testing dataset 2054; and may store the customer dataset in the data storage 2050. In some embodiments, the data storage 2050 may cache portions of the customer dataset 2005 locally.

The trainer 2040 may pretrain new models or retrain existing models identified for inclusion in the set of models 2012. Prior to operation in inference mode, the adjust logic circuitry 2000 may operate the models in the set of models 2012 such as model 2010 in training mode and train the model 2010 with training dataset 2052 from the data storage 2050. The model 2010 may switch to inference mode for validation with the testing dataset 2054 via the validate 2048 logic circuitry to determine if the model 2010 is trained. For instance, the model 2010 may adjust communications authored by customers associated with a first subset of customers for transmission to a customer associated with a second subset of customers. The training dataset 2052 may include customer data from customers associated with the first subset of customers to process via the model 2010 as well as customer data from customers associated with the second subset of customers to evaluate error associated with an output of the model 2010. The output of the model 2010 may include selections of synonyms to replace words from communications authored by the customers associated with the first subset of customers. The testing dataset 2054 may comprise customer data from the same subsets of customers as the training dataset 2052 so the model 2010 may be considered trained once the model 2010 can converge on accurate and/or consistent selections of synonyms to replace words in communications based on the testing dataset 2054.

The trainer 2040 may repeatedly select sets of customer data from the training dataset 2052 for training based on the build sample(s) selected for the model 2010. Each set of customer data may include customer data from, e.g., a randomly selected customer in the subsets of customers associated with the model and the sets of customer data may have different counts of synonyms or sizes of communications to, advantageously, increase the robustness of the training.

A backprop 2046 logic circuitry of the trainer 2040 may train the model 2010 by backward propagation of the error that is output by the model 2010 in response to the training dataset 2052. Backward propagation of the error may adjust weights and biases in the layers of the model 2010 to reduce the error. The backward propagation of the error may effectively adjust the range of predicted synonyms selected in response to the customer data that caused the model 2010 to output the error.

The data storage 2050 may include a customer dataset 2051 that comprises the training dataset 2052 and the testing dataset 2054. The training dataset 2052 and the testing dataset 2054 may include customer data from one or more customers. The data storage 2050 may also include the synonym dataset 2056, the database 2058, and word vectors 2059. The synonym dataset 2056 may include a full set of the synonyms that are identified in communications and/or full set of the synonyms that replace words in communications to adjust communications based on information known or assumed about an audience of the communications.

The database 2058 may comprise, e.g. a graph database, a relational database, or the like, to store a subset or a full set of synonyms, tags associated with the synonyms, subsets of customers associated with subsets of the synonyms via the tags, and nodes associated with tags. The tags may associate the subsets of customers with subsets of the synonyms and with models in the set of models 2012.

The data storage may also comprise word vectors 2059 as part of the database 2058 or as a distinct data structure such as a table, another database, a list, and/or the like. The word vectors 2059 may comprise a list of words that may be included in communications along with values associated with the words in the form of vectors. In other embodiments, the word vectors 2059 may comprise a model such as an algorithm, a mathematical model, or the like that can convert words into word vectors.

After the models in the set of models 2012 are trained with the training dataset 2052 and validated with the testing dataset 2054, the set of models 2012 may operate in inference mode to replace words in communications associated pairs of the nodes or subsets of customers. For instance, each model 2010 of the set of models 2012 may replace a word in a communication authored by a customer associated with a first node or first subset of customers with a synonym that is alternative word with the same meaning or a similar meaning. The alternative word may be associated with a customer of a second node or with a customer in a second subset of customers.

The monitor model 2060 may receive feedback 2065 related to the replacement of words in each communication between nodes or subsets of customers. The monitor model 2060 may receive the feedback 2065 via the API(s) 2002 from either a customer that originated a communication adjusted by one model of the set of models 2012 or a customer that is a recipient of the communication. The feedback 2065 may identify a word replaced via the one model and may comprise a positive or negative indication related to the word replaced. For instances in which the feedback 2065 comprises a negative feedback, the monitor model 2060 may record the feedback in the form of a value and may calculate an error rate related to the feedback 2065. In many embodiments, the monitor model 2060 may relate the feedback 2065 with the one model and may relate the feedback 2065 with a subset of customers. In some embodiments, the monitor model 2060 may relate the feedback 2065 with a specific customer in the subset of customers.

In further embodiments, the feedback 2065 comprises a positive feedback and the monitor model 2060 may record the feedback in the form of a value related to the word replaced, the one model, and the customer or subset of customers associated with the customer that received the communication. In many embodiments, the monitor model 2060 may record the feedback in the data storage 2050 and/or pass the feedback to the tracker model 2070.

The tracker model 2070 may track and update error rates related to word replacements in communications between nodes or subsets of customers and output a report including the error rates 2075. In many embodiments, the tracker model 2070 may receive error rates or values related to the feedback 2065, directly or via the data storage 2050, from the monitor model 2060 about word replacements in individual communications. Based on the feedback or values as well as historical values related to the corresponding subsets of customers and/or the specific customers related to the communications, the tracker model 2070 may generate and output average or mean error rates related to corresponding subsets of customers and/or specific customers. For instance, if a customer provides negative feedback related to one-out-of-three word replacements on average, the tracker model 2070 may track the average and output the average error rate or mean error rate associated with each customer. In some embodiments, the tracker model 2070 may output a historical set of error rates related to the specific customers and/or the associated subsets of customers.

In several embodiments, if the average or mean error rate for a customer exceeds an error rate threshold over a at least a minimum count of word replacements, the tracker model 2070 may determine that the customer should be moved to a different subset of customers. The tracker model 2070 may automatically associate the customer with a different subset of customers in some embodiments and may output an indication that the customer should be moved to a new subset of customers in further embodiments.

In some embodiments, the tracker model 2070 may also maintain a history of movements of customers from one subset of customers to another. Such embodiments may also determine, after a count of movements based on the number of different subsets of customers, that the customer does not cluster well with any of the current subsets of customers. If the tracker model 2070 determines that a customer does not cluster well into existing subsets of customers, the tracker model 2070 may, in some embodiments, automatically add a new subset of customers, including the customer that did not cluster well into the other subsets of customers.

In one embodiment, when the tracker model 2070 creates a new subset of customers and adds one or more customers to the subset, the customer cluster 2030 may generate a subset of synonyms to associate with the new subset of customers based on analysis or comparison of the customer data for the one or more customers against the synonym dataset 2056.

Figure 3E:
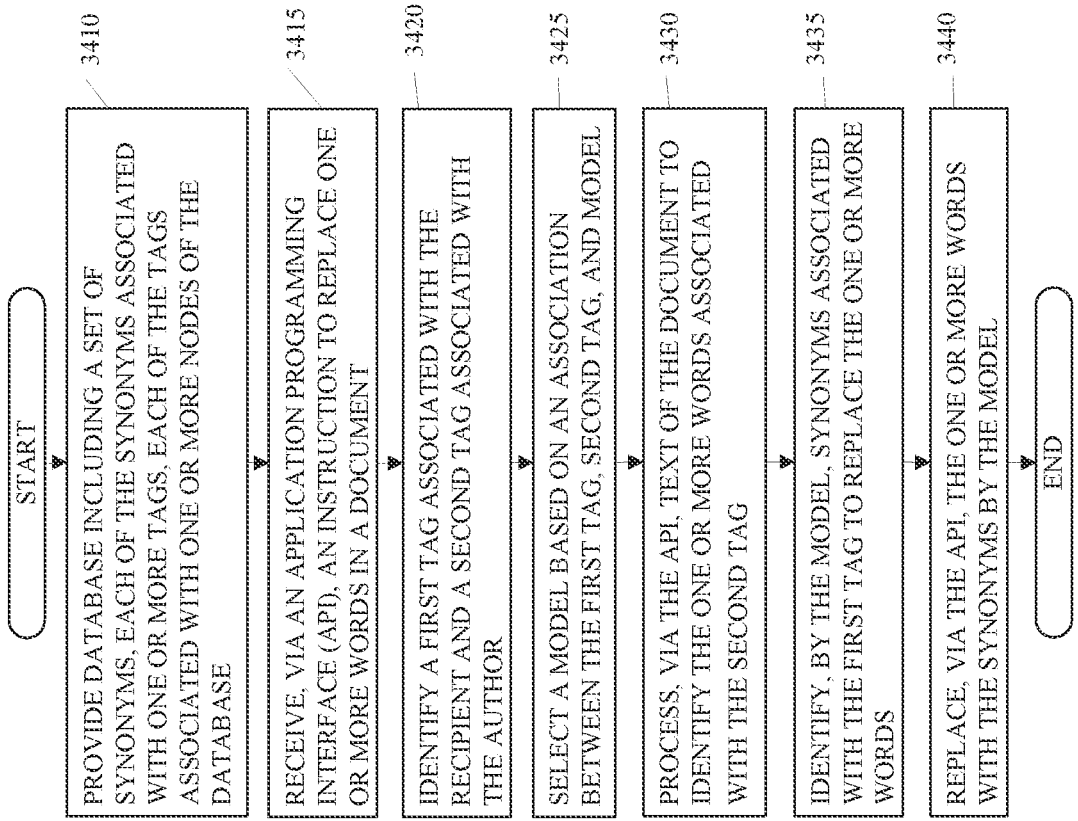

FIGS. 3A-E depict flowcharts of embodiments to adjust communications, by adjust logic circuitry, such as the adjust logic circuitry shown in FIGS. 1A, 1B, 1D, 1F, and 2. FIG. 3A illustrates a flowchart to adjust communications between customers. The flowchart starts with clustering customers into groups based on customer data, wherein each customer is associated with one of the groups (element 3010). Some embodiments may cluster the customers into groups based on the customer data associated with the customers. For instance, such embodiments may a statistical model or a machine learning model to associate each of the customers with one of the groups based on the customer data associated with each of the customers. The customer data may comprise financial information about the customers, geographical information about the customers, historical information about the customers, communications prepared by the customers, social media associated with the customers, other information associated with the customers, or a combination thereof. The communications may comprise writings authored by the customers and the writings may include one or more of the synonyms.

In many embodiments, a cluster model may associate customers with a first group based on an association between the first group and a first subset of the synonyms and associate customers with a second group based on an association between the second group and a second set of synonyms. The cluster model may compare or otherwise correlate synonyms from the subsets of synonyms with synonyms found in communications authored by the customers and/or may compare or correlate synonyms in the set of synonyms with background information associated each of the customers to associate the customers with the first group or the second group. In some embodiments, each of the groups may comprise a node in a graph database and each of the models is associated with an edge of one of the nodes in the graph database.

After clustering the customers into groups, the flowchart may proceed to associate a unique tag with each of the groups and with subsets of synonyms associated with each of the groups. For instance, the adjust logic circuitry may associate a first unique tag with the first group and with each of the synonyms of the first subset and associate a second unique tag with the second group and with each of the synonyms of the second subset (element 3015). The subsets of synonyms, while potentially having multiple common synonyms, may be unique based on inclusion of a combination of synonyms that is different from the other subsets of synonyms. An example, the first group of customers may associate with a first subset of synonyms common to a northwest region of the United States, the second group of customers may associate with a second subset of synonyms related to a dialect of the southeast United States, and a third group of customers may associate with a third subset of synonyms related to a dialect from the United Kingdom. The first and second subsets of synonyms may include many synonyms in common that differ in the third subset of synonyms.

The flowchart may also associate one or more models with pairs of the groups (element 3020). The models may comprise machine learning models such as statistical models or neural networks to train based on customer data associated with the pair of groups of customers to identify synonyms typically used by a first group of customers that should be replaced with alternative synonyms to, advantageously improve the chances that customers in a second group of the pair of groups will understand a communication authored by a customer in the first group. For instance, the first group of customers may comprise tutors with college level or doctorate level educations and the second group of customers may comprise freshman at a college with high school level educations. A first model between these two groups may learn words that are in a synonym dataset that the tutors typically use that are not common to the vocabulary of high school level customers so the first model can replace such words with synonyms that are more commonly used by the customers in the second group. In some embodiments, the first model may also learn, through feedback from customers in the second group, additional words that the tutors typically use that the high school level customers misunderstand or otherwise do not understand well.

After associating models with pairs of groups of the customers, the first model may replace at least a first synonym of the first subset of synonyms with a second synonym of the second subset of synonyms in a first communication from a first customer of the first group of customers to a second customer of the second group of customers (element 3025).

FIG. 3B illustrates a flowchart to adjust communications between groups of customers. The flowchart begins with clustering the customers into groups based on the customer data associated with the customers (element 3110). In some embodiments, a set of nodes for a graph database are provided for modelling. A subset of synonyms is associated with each node with a unique tag and a cluster model may cluster customers to determine a probability distribution associated with each of the customers that identifies a probability that each customer is associated with each of the nodes. The probability distribution may be based on a correlation between customer data associated with each of the customers and the subsets of synonyms associated with each of the nodes. For instance, the subsets of synonyms associated with each of the nodes may include metadata that associates each of the synonyms with an education level, a regional dialect, or a combination thereof and the customer data may include geographical locations of each of the customers, education levels of each of the customers, synonyms found in communications authored by each of the customers, and/or the like.

After clustering the customers into groups, the flowchart may train models to replace words in communications between each of the groups (element 3115). The flowchart may train to replace words in communications authored by a customer of the first group based on synonyms associated with the first group and synonyms associated with the second group. The training may involve training data based on customer data associated with each of the groups of customers. The customer data may include communications authored by the customers of the respective groups and/or may include background information such as the educational level of the customers in a group, the technical specialties of customers in each of the groups, the geographical locations of each of the customers in the groups, and/or the like. Replacement of words in the communication may, advantageously, tailor communications for customers in the second group to improve understanding of the content of the communications by customers in the second group.

After training the models, the flowchart may select, by a first model, a first synonym to replace with a second synonym in a communication authored by a customer in a first group that designates a customer in a second group as a recipient (element 3120). In some embodiments, the first model may comprise an interconnection between a node associated with the first group of customers and a node associated with the second group of customers.

FIG. 3C illustrates a flowchart for tracking error rates of customers. The flowchart may track error rates associated with replacement of synonyms in communications between the customers (element 3210). The error rates may represent misunderstandings by the customers responsive to the replacement of synonyms in communications. For instance, a tracker model may track feedback from or about customers that receive communications. If a customer receives a communication and marks one or more words as a source of confusion in a communication and the one or more words include synonyms in a subset of synonyms associated with that customer, the tracker model may determine an error rate associated with that customer's confusion with words that the customer is expected to understand.

FIG. 3D illustrates a flowchart for changing an association of a customer with a group of customers. In response to determining error rates associated with customers, the adjust logic circuitry may change associations of one or more of customers with the groups based on one or more of the error rates exceeding a threshold (element 3310). For instance, if the error rate associated with a customer exceeds a threshold, the customer is misunderstanding more of the words than the threshold. In some embodiments, the adjust logic circuitry may respond by changing the association of the customer to a different group that is more compatible with the customer's vocabulary and/or dialect. To illustrate, the adjust logic circuitry may cluster a first customer with a first group of customers based on the geographical location of the customers in the first group. The intention for the grouping may be to replace synonyms related to differences in the dialect of the first group of customers from other groups of customers. The first customer, however, may have recently moved to that geographical location from a different geographical location and may have a dialect that is more compatible with a second group of customers. In such situations, the adjust logic circuitry may calculate an error rate for the first customer based on misunderstandings by the first customer that are based on the dialect associated with the first group of customers. When the error rate of the first customer exceeds the threshold, the adjust logic circuitry may determine that the error rate for the first customer indicates that the first customer should be associated with a different group of customers and may change the association of the first customer from the first group of customers to the second group of customers.

FIG. 3E illustrates a flowchart to adjust communications. The flowchart begins with providing a database including a set of synonyms, each of the synonyms associated with one or more tags, each of the tags associated with one or more nodes of the database (element 3410). In other words, the database may comprise a set of nodes and each of the nodes may represent an education level and/or a dialect. The set of synonyms may include synonyms associated, via tags, with each of the nodes for identifying words typically known by customers associated with the particular nodes.

Adjust logic circuitry associated with the database may receive, via an application programming interface (API), an instruction to replace one or more words in a document drafted in the text editor, identification of an author of the document, and identification of a recipient of a document (element 3415). In response, the adjust logic circuitry may identify a first tag associated with the identification of the recipient and a second tag associated with the identification of the author (element 3420). Thereafter, the adjust logic circuitry may select a model based on the association between the first tag, the second tag, and the model (element 3425). In other words, the adjust logic circuitry may access the database to identify a model that is associated with the recipient of the document and the author of the document.

After selecting the model, the adjust logic circuitry may process, via the API, text of the document to identify the one or more words associated with the second tag (element 3430) to identify, e.g., words in the set of synonyms associated with the author. The model may identify synonyms associated with the first tag to replace the one or more words (element 3435) and replace, via the API, the one or more words with the synonyms by the model (element 3440). In other words, the model may identify words that the author typically uses in the document that may, advantageously be replaced with synonyms that the recipient typically uses and replace those words with the synonyms.

Figure 4:
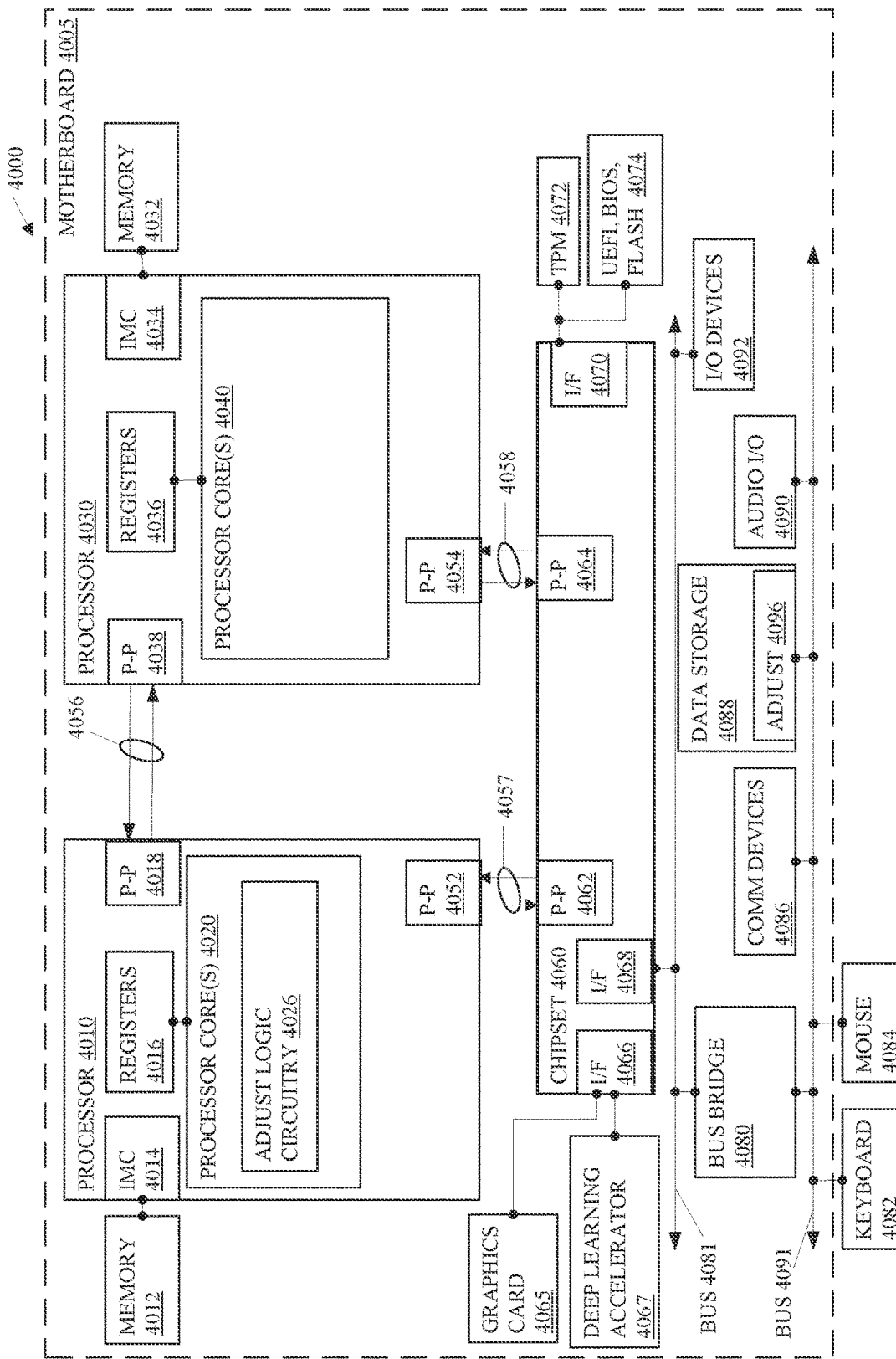
FIG. 4 depicts an embodiment of a system including a multiple-processor platform, a chipset, buses, and accessories such as the server and apparatus shown in FIGS. 1A and 1D.

FIG. 4 illustrates an embodiment of a system 4000 such as a server of the server(s) 1010 shown in FIG. 1A or the apparatus 1100 shown in FIG. 1B. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include an adjust logic circuitry 4026 such as the adjust logic circuitry 1110 shown in FIG. 1B. The adjust logic circuitry 4026 may represent circuitry configured to replace words in a communication with synonyms associated with recipients of the communication within the processor core(s) 4020 or may represent a combination of the circuitry within a processor and a medium to store all or part of the functionality of the adjust logic circuitry 4026 in memory such as cache, the memory 4012, buffers, registers, and/or the like. In several embodiments, the functionality of the adjust logic circuitry 4026 resides in whole or in part as code in a memory such as the adjust logic circuitry 4096 in the data storage unit 4088 attached to the processor 4010 via a chipset 4060 such as the adjust logic circuitry 1110 shown in FIG. 1B. The functionality of the adjust logic circuitry 4026 may also reside in whole or in part in memory such as the memory 4012 and/or a cache of the processor. Furthermore, the functionality of the adjust logic circuitry 4026 may also reside in whole or in part as circuitry within the processor 4010 and may perform operations, e.g., within registers or buffers such as the registers 4016 within the processor 4010, registers 4036 within the processor 4030, or within an instruction pipeline of the processor 4010 or the processor 4030.

In other embodiments, more than one of the processor 4010 and 4030 may comprise functionality of the adjust logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the adjust logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
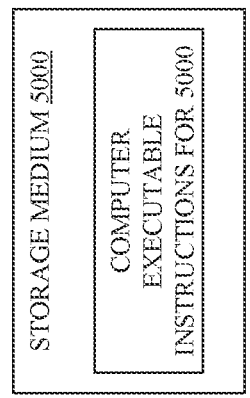
FIGS. 5-6 depict embodiments of a storage medium and a computing platform such as the server(s) shown in FIGS. 1A and 1D.

FIG. 5 illustrates an example of a storage medium 5000 to store processor data structures. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
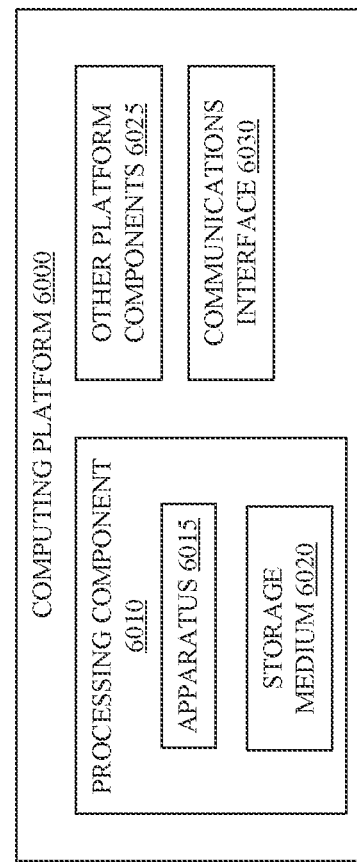

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the adjust logic circuitry 1015 and 1110 illustrated in FIGS. 1A and 1B, respectively. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the Open-Flow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:
1. An apparatus comprising:
memory; and
logic circuitry coupled with the memory to:
   receive a document comprising text;
   determine to replace one or more words in the document with one or more synonyms;
   identify a first tag associated with a recipient and a second tag associated with an author;
   select a model based on an association between the first tag, the second tag, and the model;

process, with the model, the text of the document to identify the one or more words based on an association between the one or more words and the second tag;

identify, by the model, the one or more synonyms based on an association between the one or more synonyms and the first tag; and replace the one or more words with the one or more synonyms in the document.

2. The apparatus of claim 1, wherein the document is generated by the author and intended for the recipient, and the logic circuitry to determine to replace the one or more words based on known differences, assumed differences, or both between the author and the recipient.

3. The apparatus of claim 2, wherein a known difference is a location of the author having a first dialect and a location of the recipient having a second dialect.

4. The apparatus of claim 2, wherein a known difference is a language of the author having a first dialect and a language of the recipient having a second dialect.

5. The apparatus of claim 1, wherein the first tag identifies a subset of synonyms and is assigned to a first group including the recipient.

6. The apparatus of claim 1, wherein the second tag identifies a second subset of synonyms and is assigned to a second group including the author.

7. The apparatus of claim 1, comprising storage coupled with the memory and the logic circuitry, the storage configured to store models and a set of nodes for a graph database, each node to represent an education level, a dialect, or both, and wherein the first tag is associated with a first node, and the second tag is associated with a second node.

8. The apparatus of claim 7, the logic circuitry configured to determine the selected model based on a linking in the graph database between the first node, the second node, and the selected model.

9. A computer-implemented method comprising:
receiving a document comprising text;
receiving an indication to replace one or more words in the document with one or more synonyms;
identifying a first tag associated with a recipient and a second tag associated with an author;
selecting a model based on an association between the first tag, the second tag, and the model;
processing, with the model, the text of the document to identify the one or more words based on an association between the one or more words and the second tag;
identifying, by the model, the one or more synonyms based on an association between the one or more synonyms and the first tag; and
replacing the one or more words with the one or more synonyms in the document.

10. The computer-implemented method of claim 9, wherein the document is generated by the author and intended for the recipient, and the method comprising determining to replace the one or more words based on known differences, assumed differences, or both between the author and the recipient.

11. The computer-implemented method of claim 10, wherein a known difference is a location of the author having a first dialect and a location of the recipient having a second dialect.

12. The computer-implemented method of claim 10, wherein a known difference is a language of the author having a first dialect and a language of the recipient having a second dialect.

13. The computer-implemented method of claim 9, wherein the first tag identifies a subset of synonyms and is assigned to a first group including the recipient.

14. The computer-implemented method of claim 9, wherein the second tag identifies a second subset of synonyms and is assigned to a second group including the author.

15. The method of claim 1, comprising storing, in a storage, models and a set of nodes for a graph database, each node to represent an education level, a dialect, or both, and wherein the first tag is associated with a first node, and the second tag is associated with a second node.

16. The computer-implemented method of claim 15, comprising determining the selected model on a linking in the graph database between the first node, the second node, and the selected model.

17. A computer-implemented method comprising:
receiving a document comprising text, a first identifier to identify an author, and a second identifier to identify a recipient;
identifying, via the second identifier, a first tag associated with the recipient;
identifying, via the first identifier, a second tag associated with the author;
selecting a model based on a linking between the first tag, the second tag, and the model in a graph database;
processing, with the model, the text of the document to identify the one or more words based on an association between the one or more words and the second tag;
identifying, by the model, the one or more synonyms based on an association between the one or more synonyms and the first tag; and
replacing the one or more words with the one or more synonyms in the document.

18. The computer-implemented method of claim 17, wherein the first tag identifies a subset of synonyms and is assigned to a first group including the recipient.

19. The computer-implemented method of claim 17, wherein the second tag identifies a second subset of synonyms and is assigned to a second group including the author.

20. The computer-implemented method of claim 17, comprising storing in a storage models and a set of nodes for a graph database, each node to represent an education level, a dialect, or both, and wherein the first tag is associated with a first node, and the second tag is associated with a second node.

* * * * *